United States Patent [19]

Iwasaki

[11] Patent Number: 4,674,995
[45] Date of Patent: Jun. 23, 1987

[54] BICYCLE FRONT DERAILLEUR

[75] Inventor: Yoshihisa Iwasaki, Sakai, Japan

[73] Assignee: Maeda Industries, Ltd., Osaka, Japan

[21] Appl. No.: 817,105

[22] Filed: Jan. 8, 1986

[30] Foreign Application Priority Data

Jan. 9, 1985 [JP] Japan ................ 60-1723[U]

[51] Int. Cl.$^4$ .................................. F16H 9/06
[52] U.S. Cl. ...................................... 474/80
[58] Field of Search ............... 474/78, 80, 82; 280/236

[56] References Cited

U.S. PATENT DOCUMENTS

| | | | |
|---|---|---|---|
| 4,194,409 | 3/1980 | Nagano | 474/80 |
| 4,199,974 | 4/1980 | Isobe | 474/82 |
| 4,199,998 | 4/1980 | Isobe | 474/82 |
| 4,223,562 | 9/1980 | Nagano et al. | 474/82 |
| 4,362,522 | 12/1982 | Huret | 474/82 |
| 4,516,961 | 5/1985 | Coué | 474/80 |
| 4,551,121 | 11/1985 | Nagano | 474/82 X |

FOREIGN PATENT DOCUMENTS 59-31594  2/1984  Japan .

Primary Examiner—James A. Leppink
Assistant Examiner—Thuy M. Bui
Attorney, Agent, or Firm—Birch, Stewart, Kolasch & Birch

[57] ABSTRACT

A front bicycle derailleur for shifting a drive chain on a front gear including a smallest sprocket, an intermediate sprocket, and a largest sprocket, comprising a pair of parallel inner and outer guide plates opposed to each other with the drive chain interposed therebetween at a part positioned in a path of movement of the drive chain toward the front gear, and a control mechanism for laterally translating the guide plates to shift up and down the drive chain on the front gear, wherein the inner guide plate provides a first portion pressing the chain for shifting it from the smallest sprocket to the intermediate sprocket and a second portion pressing the chain for shifting it from the intermediate sprocket to the largest sprocket, the second chain pressing portion being positioned outside of an arc of an imaginary circle concentric with the sprockets of the gear and which arc passes through the first chain pressing portion.

6 Claims, 6 Drawing Figures

BICYCLE FRONT DERAILLEUR

BACKGROUND OF THE INVENTION

1. Field of the Invention

This invention relates to a bicycle front derailleur which is used in cooperation with a front gear comprising a plurality of chain sprockets arranged side by side and having different numbers of teeth, and which is designed to shift a drive chain selectively from one sprocket to another for speed change. More particularly, the invention relates to an improved bicycle front derailleur of the type that is designed for use with a particular type of front gear having three or more chain sprockets, wherein the improvements are made to provide a good performance in shifting the chain from the smallest sprocket to a larger sprocket as well as from an intermediate sprocket to the largest sprocket.

2. Description of Related Art

The conventional bicycle front derailleur generally has a basic arrangement as illustrated in FIGS. 5 and 6. Thus, a description will be first made hereinafter to explain the basic arrangement of the conventional front derailleur with reference to FIGS. 5 and 6.

The conventional bicycle front derailleur has a base member 3 (FIG. 6) fixed to a lower portion of a seat pipe 1 at a position adjacent to a hanger lug by means of a clamp band 2. A movable element 5 is mounted to the base member 3 via a control mechanism such as a parallelogram-shaped pantograph link mechanism 4. The pantograph link mechanism 4 comprises outer and inner links 6, 7 pivoted, by means of pins, at their upper ends to the base member 3 and at their lower ends to the movable element 5. The pins, which connect each upper end of the links 6, 7 to the base member 3, and each lower end thereof to the movable element 5, provide four apexes of the parallelogram, so that a pivotal movement of the links 6, 7 relative to the base member 3 provides dislocation of the movable element 5 with its orientation kept constant. The pantograph mechanism 4 is normally urged in one direction for deformation by a torsion spring 8 which is fitted on the pin connecting the inner link 7 to the movable element 5 and which is engaged at its one end with a certain member on the base member and at its other end with the movable element 5. The pantograph mechanism 4 is also deformable by pivoting the links 6, 7 against the urging force of the spring 8 via a known control cable W.

The movable element 5 is provided with inner and outer guide plates 9, 10 whose side surfaces are substantially parallel to those of sprockets S and whose arcuate lower edges 9a, 10a respectively extend substantially circumferentially about the sprockets S. The guide plates 9, 10 are arranged to flank a part of a drive chain C that is at a point before engagement with a selected one of the front gear sprockets S. Thus, when the movable element 5 moves inwardly, the inner face of the outer guide plate 10 pushes on the aforesaid part of the chain C inwardly to disengage it from e.g. the largest sprocket s3. On the other hand, when the movable element 5 moves outwardly, the inner face of the inner guide plate 9 pushes on the aforesaid part of the chain C e.g. on the smallest sprocket s1 to forcibly shift it into initial engagement with a larger sprocket s2 or s3.

Immediately after the forcible disengagement from the largest sprocket s3 by the outer guide plate 10, the chain C is shifted down onto a smaller sprocket s1 or s2 for full engagement therewith, by a tension force derived from a rear derailleur (not shown). On the other hand, the chain C forced into the initial engagement with e.g. the largest sprocket s3 by the inner guide plate 9 is brought into full engagement therewith as the sprocket s3 rotates.

The conventional front gear of the type that is now popular, typically illustrated in FIG. 5 as having three sprockets, is characterized in that the innermost smallest sprocket s1 among the three is considerably reduced in diameter than the outermost largest sprocket s3 in order to provide an improved climbing ability of a bicycle which permits an easier cycling in running up a slope.

Thus, in a particular type of the conventional bicycle front derailleur for use with the above described multiple front gears, it is customary that a vertical distance between the arcuate lower marginal edge 9a of the inner guide plate 9 and the similar edge 10a of the outer guide plate 10 is much greater than that in an ordinary type of conventional front derailleur so that the lower edge 9a which, at a certain point thereof, will push on the chain C can be disposed as close as possible to the proximity of the circumference of the smallest sprocket s1, as seen in FIG. 5, in order to perform good shifting of the chain C from the smallest sprocket s1 onto the neighboring intermediate sprocket s2. This particular arrangement is advantageous in that, since the lower edge 9a is able to push on the chain C outwardly at a point relatively close to the circumference of the smallest sprocket s1, even a small displacement of the movable element 5 or the inner guide plate 9 permits initial engagement of the chain C with the intermediate sprocket s2 resulting in an immediate response to the gear change operation.

However, with the above arrangement in which the arcuate lower edge 9a is lowered for maintaining its concentric relation with circles defining the circumferences of the sprockets, the following disadvantage is brought about when the chain C is shifted from the intermediate sprocket s2 onto the largest sprocket s3, although the above discussed improvement in shifting the chain C from the smallest sprocket s1 onto the intermediate sprocket s2 is attained.

Because the lower edge 9a of the inner guide plate 9 is disposed lower than that in the ordinary front derailleur, as seen in FIG. 5, the inner face of the inner plate 9 extends downwardly and overlaps the inner side surface of the largest sprocket s3 to a larger extent. As a result, even if the inner guide plate 9 is moved outwardly in an attempt to push on the chain C to move it from the intermediate sprocket s2 toward the largest sprocket s3 for engagement therewith, the chain C is likely to be trapped between the inner guide plate 9 and the largest sprocket s3, as shown in phantom lines in FIG. 6.

Thus, in the prior art front derailleur to be used in cooperation with the triple sprocket type front gear as illustrated in FIGS. 5 and 6, the downwardly extended lower edge 9a of the inner guide plate 9 on one hand results in improved shiftability of the chain from the smallest sprocket s1 to the intermediate sprocket s2, but on the other hand leads to deterioration in shiftability of the chain from the intermediate sprocket s2 onto the largest sprocket s3. As elucidated hereinbefore, this results from the fact that the downwardly extended lower edge 9a of the arcuate inner guide plate 9 pushes the chain C at a point reasonably close to the smallest sprocket s1 when the chain C is shifted from the smallest sprocket s1 onto the intermediate sprocket s2, whereas in shifting of the chain C from the intermediate sprocket s2 onto the largest sprocket s3, the extended lower edge 9a pushes the chain C at a point excessively close to the intermediate sprocket s2.

SUMMARY OF THE INVENTION

It is, therefore, an object of the present invention to provide a bicycle front derailleur which, when used for a bicycle equipped with three or more front sprockets including the smallest and largest sprockets s1, s3 of greatly differing diameters, affords good performance in shifting a chain C from the smallest sprocket s1 onto a larger sprocket as well as from an intermediate sprocket s2 onto the largest sprocket s3.

According to the present invention, there is provided a bicycle front derailleur comprising: a pair of parallel inner and outer guide plates 9, 10 opposed to each other so as to flank a drive chain (C) at a point before engagement with a selected one of a plurality of different sized sprockets S, and a control mechanism for displacing the inner and outer guide plates 9, 10 while maintaining the parallel relationship therebetween, characterized in that a point (A) on the inner guide plate 9 at which the inner guide plate pushes on the drive chain C in order to shift it from an intermediate sprocket s2 onto a largest sprocket s3 is located outside of an arc of an imaginary circle which is concentric with the sprockets S and which passes through a point (B) on the inner guide plate 9 at which the inner guide plate pushes the chain C in order to shift it from a smallest sprocket s1 onto the intermediate sprocket s2.

In order to realize the above described change of the point (A) at which the inner guide plate 9 pushes on the chain C for shifting the chain from the intermediate sprocket s2 onto the largest sprocket s3, the inner guide plate 9, whose lower marginal edge 9a is substantially defined by an arc of an imaginary circle concentric with the sprockets S, may be transversely recessed by a predetermined distance along a front half of the marginal edge 9a thereof. Alternatively, the inner guide plate 9 may be partly cut away at its front half along the lower edge 9a to provide a stepped lower edge 9b which is farther from the circumferences of the sprockets at the front half than at the rear half.

As set forth in the foregoing, the point (A) at which the inner guide plate 9 pushes on the chain C on the intermediate sprocket s2 for shifting it onto the largest sprocket s3 is located outside of an arc of an imaginary circle which is concentric with the sprockets S and passes through the point B at which the inner plate 9 pushes the chain C on the smallest sprocket s1 for shifting it onto the intermediate sprocket s2. In other words, the point at which the inner guide plate 9 pushes on the chain C on the intermediate sprocket s2 toward the largest sprocket s3 is retreated away from the circumference of the intermediate sprocket s2 from a conventional position. This means a reduction or elimination of an overlapped relation between the largest sprocket s3 and the lower portion of the inner guide plate 9 including the point (A) which will push on the chain C onto the intermediate sprocket s2. Thus, in contrast to the already described conventional front derailleur in which the lower portion of the inner guide plate 9 including the chain pushing point (A') interferingly overlaps with the largest sprocket s3, the present invention enables it to prevent the chain C from being trapped between the inner guide plate 9 and the largest sprocket s3 when the chain C is shifted from the intermediate sprocket s2 onto the largest sprocket s3. Thus, the front derailleur of the present invention ensures smooth shifting of the chain C from the intermediate sprocket s2 onto the largest sprocket s3.

On the other hand, when the chain C is shifted from the smallest sprocket s1 onto the intermediate sprocket s2, the chain pushing point (B) on the inner guide plate 9 is located maximally close to the circumference of the smallest sprocket s1 as in the case of the conventional front derailleur. Thus, the front derailleur of the present invention still retains good shiftability of the chain C from the smallest sprocket s1 to the intermediate sprocket s2.

To sum up, the front bicycle derailleur according to the present invention, which is designed for use with a front gear having three or more different sized sprockets including a smallest sprocket s1 considerably reduced in diameter for shifting a drive chain C onto a selected one of the sprockets, facilitates a smooth shifting of the chain C from the smallest sprocket s1 onto the intermediate sprocket 52 as well as from the intermediate sprocket s2 onto the largest sprocket s3. Such smooth shifting of the chain C being difficult to achieve with a conventionally shaped inner guide. Further, the present invention requires merely a shape alteration of the conventional inner guide plate 9 without addition of any extra parts, which is advantageous in the manufacturing cost.

Other objects, features and advantages of the present invention will become apparent from the following detailed description.

DESCRIPTION OF THE PREFERRED EMBODIMENTS

Figure 1:
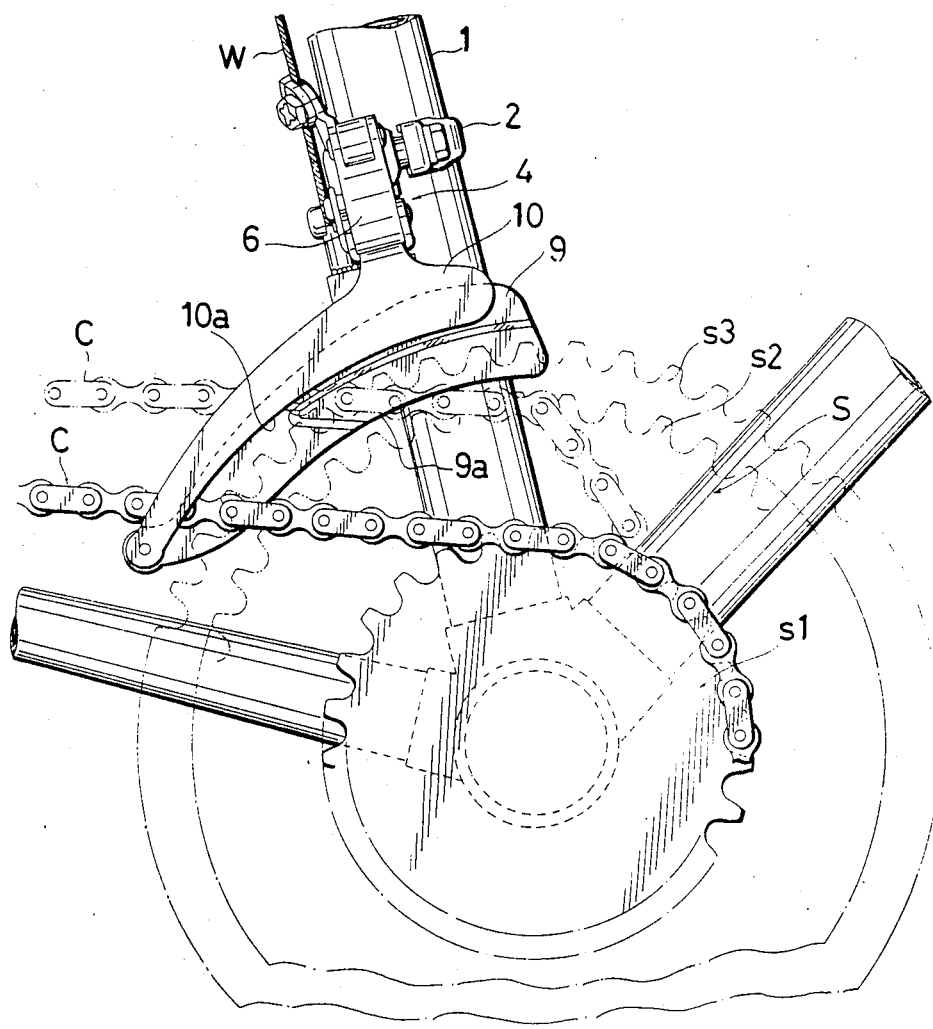
FIG. 1 is an overall side elevational view of a bicycle front derailleur embodying the invention.
Figure 2:
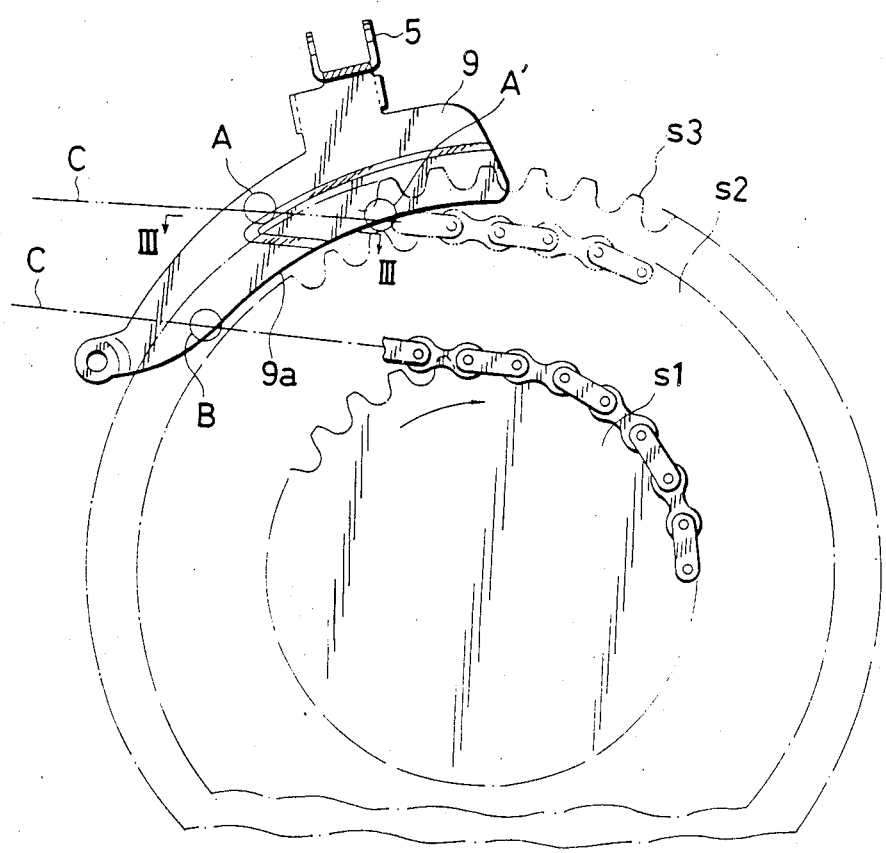
FIG. 2 is an explanatory illustration of the relation of an inner guide plate with sprockets and a chain.
Figure 3:
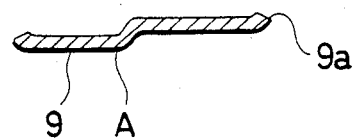
FIG. 3 is a view in section taken on line III—III in FIG. 2.

FIGS. 1 to 3 illustrate a front derailleur according to the present invention. In these figures, the structural elements equivalent to those of the prior art shown in FIGS. 5 and 6 are referred to by the same reference numerals and characters as used in FIGS. 5 and 6.

Figure 5:
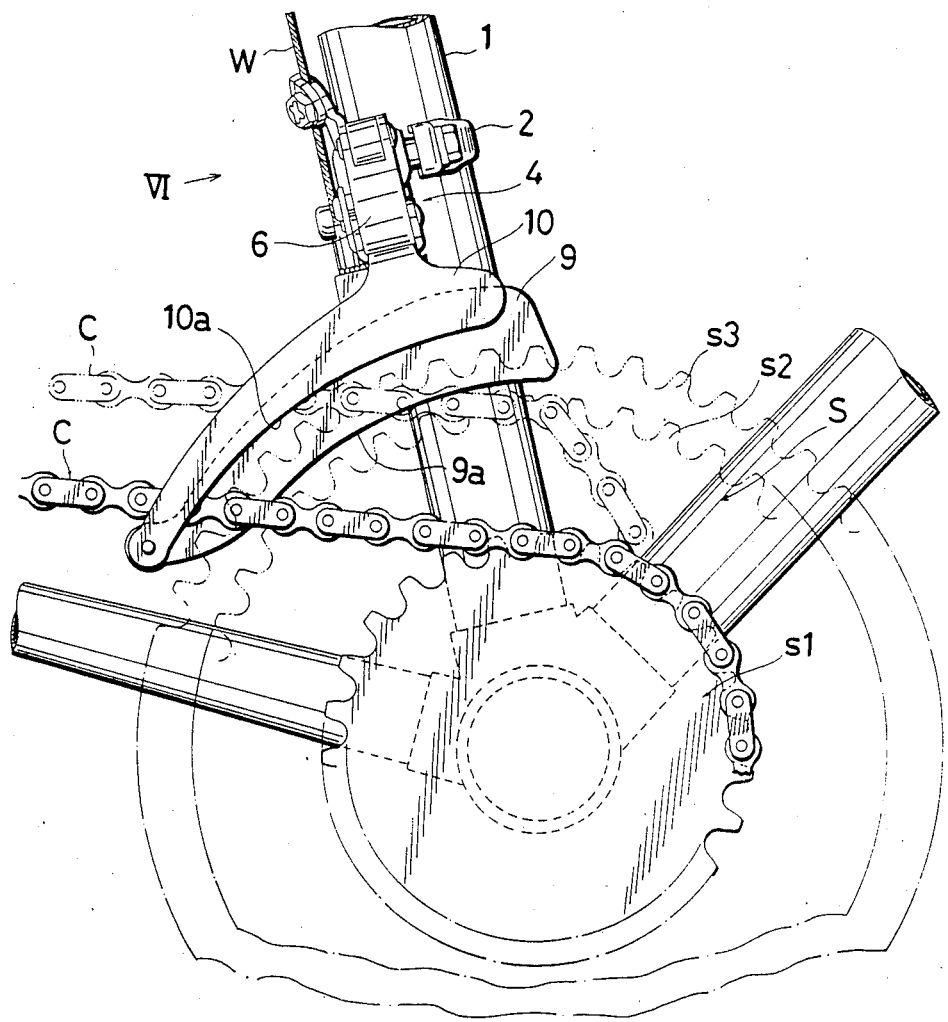
FIG. 5 is an overall side view of a prior art front derailleur on which the present invention is based.
Figure 6:
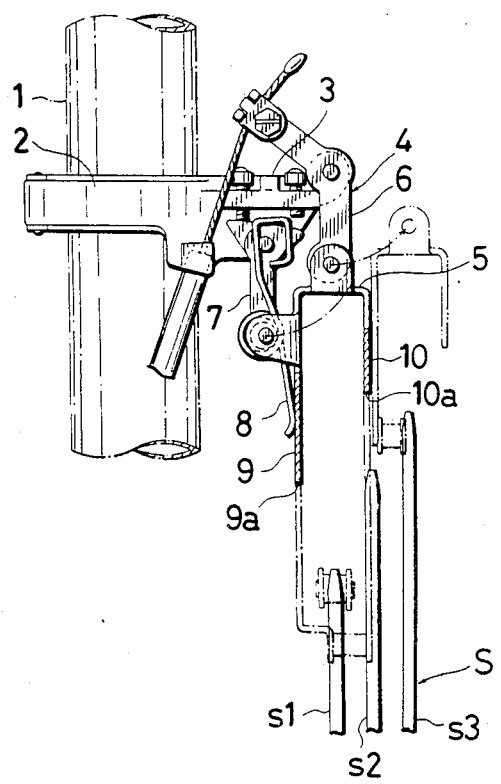
FIG. 6 is an elevation viewed in the direction of an arrow VI in FIG. 5.

The front derailleur of the present invention may be constructed similarly to the prior art of FIGS. 5 and 6 except for the structure of an inner guide plate 9. More specifically, a base member 3 (FIG. 6) is fixed to a lower portion of a seat pipe 1 by means of a clamp band 2, and a movable element 5 is supported by the base member 3 via a pantograph link mechanism 4 for inward and outward displacement thereof. The movable element 5 is provided with a pair of parallel inner and outer guide plates 9, 10 to flank a chain C at a point before engagement with a selected one of sprockets s1, s2, s3 of the front gear. The side surfaces of the plates 9, 10 are substantially in parallel with those of the sprockets s1, s2, s3.

The outer guide plate 10 is roughly crescent-shaped in side elevation and has an arcuate lower edge 10a extending rearwardly from the top of the largest sprocket s3 through a specified angle along the circumference thereof. The outer guide plate 10 is connected at its upper portion to the movable element 5. The vertical position of the outer guide plate 10 is determined by adjusting the clamping position of the clamp band 2 to the seat support pipe so that the lower edge 10a does not interfere with the outer periphery of the largest sprocket s3.

The rear end of the outer guide plate 10 is extended down enough to intersect, in side view, with the chain C (shown in solid lines in FIG. 1) at a point before engagement with the smallest sprocket s1.

As far as the inner guide plate 9 of the illustrated embodiment is concerned, it is identical in side elevational configuration to the prior art inner guide plate shown in FIG. 5. More particularly, the inner guide plate 9 is generally crescent-shaped in side view and has an arcuate lower edge 9a extending downwardly and considerably beyond the lower edge 10a of the outer guide plate 10. The inner guide plate is also connected at its upper portion to the movable element 5.

As illustrated in FIG. 1, the path of running movement of the chain C should be varied in dependence on the diameter of a particular sprocket with which the chain is to be selectively engaged. In other words, there arises a difference in the level of the chain path, depending on whether the chain is in engagement with the smallest sprocket s1 (chain indicated in solid lines), or with the intermediate sprocket s2 (chain indicated in phantom lines), or with the largest sprocket s3 (chain not shown). When a reference is based on the guide plates, a position at which the chain C intersects the guide plates varies as the chain C shifts from one to another of the sprockets.

According to the present invention, a point (A), on the inner guide plate 9 at which the guide plate 9 pushes on the chain C when it is positioned on the intermediate sprocket s2 (i.e., the chain C indicated in the phantom lines in FIG. 1) order to shift the chain C onto the largest sprocket s3, is located outwardly of an arc of an imaginary circle which is positioned at the outer diameter of the largest sprocket and is concentric with the sprockets. Point (B) on the inner guide plate 9 is the location at which the guide plate 9 pushes on the chain C when it is positioned on the smallest sprocket s1 (i.e., the chain C indicated in the solid lines in FIG. 1) order to shift the chain C onto the intermediate sprocket s2, is located outwardly from an arc from an imaginary circle concentric with the sprockets of the gear and which arc passes through the first chain pressing portion.

The lower edge 9a of the inner guide plate 9 is partially recessed slightly away from one side face of the chain, in which the recessed portion extends lengthwise from a mid portion to a front end of the guide plate 9, as clearly illustrated in FIGS. 2 and 3. As a result, the actual chain pushing point (A) on the inner guide plate 9 is retreated rearwardly along the path of the running chain C from an imaginary point (A') at which the chain C would be pushed on by the inner guide plate 9 if such receded portion is not provided. Thus, upon lateral outward movement of the inner guide plate 9, it comes into contact with the chain C at the pushing point (A) to subsequently force the chain C outwardly to shift it from the intermediate sprocket into initial engagement with the largest sprocket s3.

On the other hand, in shifting of the chain C from the smallest sprocket s1 onto the intermediate sprocket s2, the inner plate 9 comes into contact with the chain C at the point (B) at which the inner guide plate 9 intersects the path of the running chain C on the smallest sprocket s1 as indicated in solid lines, and pushes the chain C at that point outwardly to subsequently force the chain C into engagement with the intermediate sprocket s2.

FIG. 2 shows the location of the imaginary pushing point (A') on the path of the running chain C at which the inner guide plate 9 will push on a part of the chain C at a point before engagement with the intermediate sprocket s2 if the receded portion is not provided. The location of the actual pushing point (A) at which the inner guide plate 9 pushes on a part of the chain point is located farther from the intermediate sprocket s2 than the point (A') and the actual point (A) does not overlap with any portion of the largest sprocket s3. Accordingly, the bicycle front derailleur of the invention gives a solution to the problem that the chain C is likely to be trapped between the inner guide plate 9 and the largest sprocket s3 when the chain is shifted from the intermediate sprocket s2 onto the largest sprocket s3, the problem being inherent to the prior art front derailleur discussed hereinbefore with reference to FIG. 5.

Figure 4:
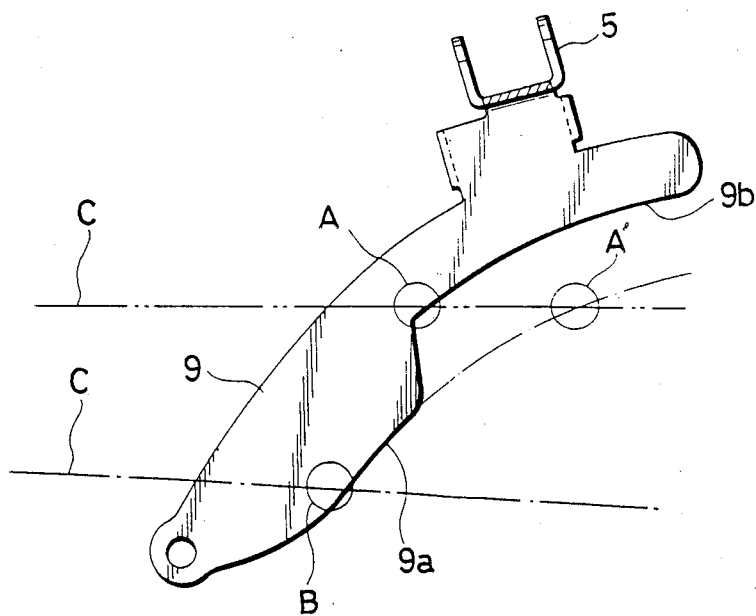
FIG. 4 is a side elevational view showing a modified inner guide plate.

FIG. 4 illustrates a modification of the inner guide plate 9 for the front bicycle derailleur of the present invention, wherein a front half portion of the inner guide plate, which is recessed in the embodiment of FIGS. 1 to 3, is removed or cut away. In this case also, the chain pushing point (A) on the inner guide plate chain C is retreated rearwardly along the path of the running chain C, as compared to the imaginary pushing point (A') at which the prior art inner guide plate will push on the chain C, so that the same function and effects as in the embodiment of FIGS. 1 to 3 can be expected.

The present invention, as a matter of course, should not be limited to the specific structure and arrangement of the embodiments described hereinbefore. The configuration of the inner and outer guide plates 9, 10 may be varied as desired. Provided that the inner guide plate is designed to retain the above described positional relation between the chain pushing point (B) for shifting the chain C on the smallest sprocket and the chain pushing point (A) for shifting the chain C on the intermediate sprocket, the remainder structural elements and arrangement of the front derailleur may be modified in any way.

Although the pantograph link mechanism as a control means for displacing the movable element 5 is illustrated as being a low normal type, a top normal type thereof may also be employed.

What is claimed is:

1. A front bicycle derailleur for shifting a drive chain from one to another sprocket of a front gear including a smaller sprocket, at least one intermediate sprocket, and a larger sprocket, comprising:
   a pair of opposed inner and outer guide plates arranged substantially parallel to each other and to the sprockets of the front gear with a part of the drive chain interposed between the guide plates, said part of the drive chain being positioned in a path of movement of the drive chain toward the front gear, and
   a control mechanism for laterally translating the guide plates to shift up and down the drive chain on the front gear, the inner guide plate being designed to provide a first portion pressing the chain for shifting it from the smallest sprocket to the intermediate sprocket and a second portion which presses the chain for shifting it from the intermediate sprocket to the largest sprocket, said second portion being positioned outside of an arc of an imaginary circle concentric with the sprockets of the front gear and passing through said first portion.

2. The derailleur according to claim 1, wherein the inner guide plate has a generally arcuate lower marginal portion which is transversely recessed in its front section to be farther from the outer guide plate than the remainder of the inner guide plate.

3. The deraileur according to claim 1, wherein the inner guide plate has a lower marginal portion which is partially cut away in its front section to provide a rear lower edge and a front lower edge, said front lower edge being positioned radially farther from the circumferences of the sprockets of the front gear than the lower rear edge.

4. A front bicycle derailleur for shifting a drive chain from one to another sprocket of a front gear including a smaller sprocket, at least one intermediate sprocket, and a larger sprocket, comprising:
   a pair of opposed inner and outer guide plates arranged substantially parallel to each other and to the sprockets of the front gear with a part of the drive chain interposed between the guide plates, said part of the drive chain being positioned in a path of movement of the drive chain toward the front gear, and
   a control mechanism for laterally translating the guide plates to shift up and down the drive chain on the front gear,
   the inner guide plate being designed to provide a first portion pressing the chain for shifting it from the smallest sprocket to the intermediate sprocket and a second portion which presses the chain for shifting it from the intermediate sprocket to the largest sprocket, said second portion being positioned outside of an arc of an imaginary circle concentric with the sprockets of the front gear and having a diameter equal to the outer diameter of the largest sprocket.

5. The derailleur according to claim 4, wherein the inner guide plate has a generally arcuate lower marginal portion which is transversely recessed in its front section to be farther from the outer guide plate than the remainder of the inner guide plate.

6. The derailleur according to claim 4, wherein the inner guide plate has a lower marginal portion which is partially cut away in its front section to provide a rear lower edge and a front lower edge, said front lower edge being positioned radially farther from the circumferences of the sprockets of the front gear than the lower rear edge.

* * * * *